(No Model.)

H. C. MONTGOMERY.
CHECK VALVE.

No. 382,655. Patented May 8, 1888.

Witnesses.

Inventor:
Harry C. Montgomery.
H. T. Fisher,
Attorney.

UNITED STATES PATENT OFFICE.

HARRY C. MONTGOMERY, OF CLEVELAND, OHIO.

CHECK-VALVE.

SPECIFICATION forming part of Letters Patent No. 382,655, dated May 8, 1888.

Application filed October 22, 1887. Serial No. 253,061. (No model.)

*To all whom it may concern:*

Be it known that I, HARRY C. MONTGOMERY, a citizen of the United States, residing at Cleveland, in the county of Cuyahoga and State of Ohio, have invented certain new and useful Improvements in Check-Valves; and I do hereby declare that the following is a full, clear, and exact description of the invention, which will enable others skilled in the art to which it appertains to make and use the same.

The invention relates to improvements in check-valves; and it consists in the construction and combination of parts, hereinafter described, and especially pointed out in the claims.

Figure 1:
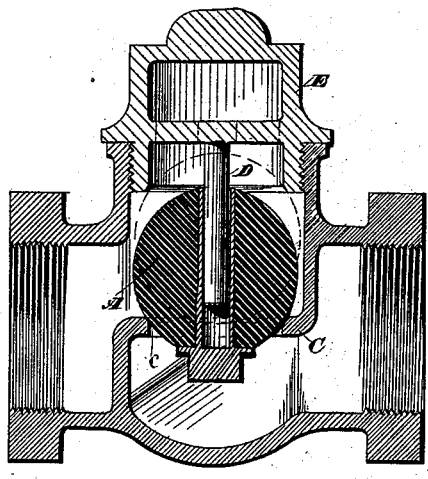
Figure 2:
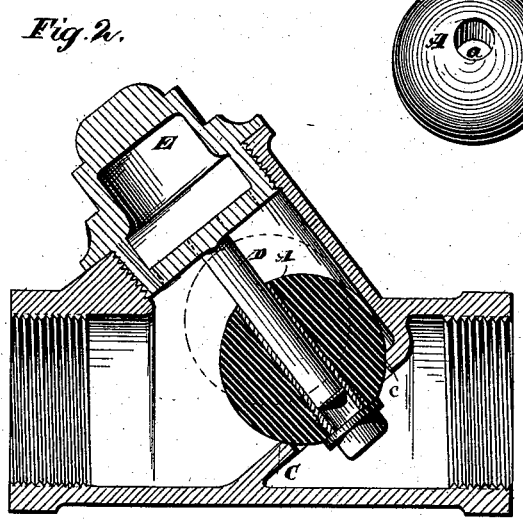
Figure 3:
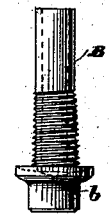
Figure 4:

In the accompanying drawings, forming part of this specification, Figure 1 is a vertical section of a valve and valve-seat embodying my improvement. Fig. 2 illustrates a somewhat different form, in that the valve-seat and valve are in inclined position, and showing the construction as adapted to straight-way check-valves. Fig. 3 is a separate view of the valve, and Fig. 4 a separate view of the stem.

The valve A (shown in the drawings) consists of rubber molded into spherical form with an opening, $a$, through its axis. Into this opening I insert a tube, B, having a flanged head, $b$, and projecting through the ball and fitting snugly therein, so that no fluid can enter or pass between the tube and the ball. The tube is screw-threaded a portion of its length to make the seal more perfect and to secure the two elements firmly together. The valve thus constructed is free to play vertically above its seat $c$ in the diaphragm C on a stem, D, shown here as projecting from the screw cap or plug E. The stem D forms a guide for the valve, upon which the valve is free to turn axially or rise and fall, but which serves at the same time to center the valve and direct it to its seat after pressure from below is withdrawn. This construction enables me to reverse the valve upon its tube and stem, so that when one side is worn so as to require change the other side may be substituted, and thus a practically new valve be obtained; but these valves are very firm and durable and are not easily worn out. I have known them to be employed in injectors for steam-boilers an entire year without renewal. Besides, they have the advantage of doing their work quietly and without the noise which attends the use of metal valves.

There is no hammering or pounding on the valve-seat noticeable when rubber is used, and especially is there no pounding out of the valve-seat, as in the use of metal balls. A further advantage of rubber over metal is the fact that metal balls require careful turning up and truing to make them perfectly round, which requires much painstaking labor and time. I can mold the rubber balls so perfectly as to require no preparation after they have left the mold. This makes a great difference in the initial cost of the two valves to the advantage of rubber as employed by me.

In Fig. 2 I show the same construction, in which the parts are set at an inclination of less than forty-five degrees and adapted to use as a straight-way check-valve. A varying inclination may be adopted, the guide serving in all cases to center the valve and direct it to its seat. This form of valve may be used with steam, water, gas, or other appliances, and wherever a valve having substantially the function of the one here shown is desirable. It is especially advantageous in traction and other engines employed at long distances from repair-shops, as the valve is not liable to be broken and can be kept in stock in any hardware or country store accessible to farmers, who require nothing but a wrench to put a new valve in position.

Having thus described my invention, what I claim as new, and desire to secure by Letters Patent, is—

1. In check-valves, a spherical rubber valve having a tube extending through its center, said tube being closed at its lower end and open at its upper, in combination with a casing having a single valve-seat, a plug set into said casing from the top and having a stem projecting inwardly therefrom and into the tube of the valve aforesaid and guiding the same, whereby, when pressure upon the valve from beneath is removed, the valve will automatically seat itself, substantially as set forth.

2. In check-valves, the combination of the casing having the diaphragm C, with a valve-seat on its upper surface, a reversible ball-valve, A, provided with a tube, B, through its center and having the flanged head *b* at its bottom, and a screw-plug, D, set in the casing above the valve and having a stem projecting into the tube B, substantially as set forth.

HARRY C. MONTGOMERY.

Witnesses:
H. T. FISHER,
I. L. COREY.